United States Patent [19]

Johnson et al.

[11] 4,281,513
[45] Aug. 4, 1981

[54] FIELD EFFECT MEMORY ALLOY HEAT ENGINE

[76] Inventors: Alfred D. Johnson; Paul F. Kirkpatrick, both of 5383 Bancroft Ave., Oakland, Calif. 94601

[21] Appl. No.: 27,737

[22] Filed: Apr. 6, 1979

[51] Int. Cl.$^3$ .............................................. F03G 7/06
[52] U.S. Cl. ......................................... 60/527; 60/529
[58] Field of Search ............................... 60/527–531, 60/721

[56] References Cited

U.S. PATENT DOCUMENTS

| 2,878,641 | 3/1959 | Decker | 60/527 |
| 4,086,769 | 5/1978 | Smith | 60/527 |
| 4,087,971 | 5/1978 | Hart | 60/527 |
| 4,236,377 | 12/1980 | Weinert | 60/527 X |

FOREIGN PATENT DOCUMENTS 1540330  2/1979  United Kingdom ...................... 60/529

*Primary Examiner*—Allen M. Ostrager
*Assistant Examiner*—Stephen F. Husar
*Attorney, Agent, or Firm*—Flehr, Hohbach, Test, Albritton & Herbert

[57] ABSTRACT

A heat engine employing a memory alloy and a force field such as gravity for converting heat energy into mechanical work. Field effect elements are mounted on the distal ends of flexible spokes which in turn are mounted about a hub to form a rotating wheel. The memory alloy is in the form of a helix disposed about the circumference of the wheel and interconnecting the ends of adjacent spoke pairs. Heat is transferred to segments of the memory alloy on one side of the wheel so that the segments deform toward their memory shape and deflect the associated spokes toward each other. Heat is transferred away from the memory alloy segments on the opposite side so that the segments deform toward their trained shape and permit the spokes to flex apart. The concentration of field effect elements on the first side of the wheel is greater than the concentration on the other side so that the resultant force created by a remote field acts as a torque for rotating the wheel.

12 Claims, 3 Drawing Figures

FIELD EFFECT MEMORY ALLOY HEAT ENGINE

This invention relates in general to heat engines employing a shape memory alloy material for converting heat energy into mechanical work.

Heat engines of the foregoing type employ a shape memory alloy material, such as Nitinol, having the remarkable property of undergoing plastic deformation from a memory shape to a trained shape when cooled and then deforming back to the memory shape when warmed while exerting a greater force than the deforming force during cooling. A shape memory material of the foregoing type is described in U.S. Pat. No. 3,403,238 to Buehler. Many Nitinol heat engines which have heretofore been constructed are severely limited in thermodynamic efficiency. A Nitinol engine incorporating a heat regenerator for improving this efficiency is described in U.S. Pat. No. 4,055,955 issued to the present inventor.

Various engine designs have been proposed in an attempt to overcome the problems of limited output power and complexity of previous shape memory engines. An example of such a design is disclosed in U.S. Pat. No. 4,027,479 issued to Cory. The heat engine of the Cory patent employs field effect elements which are interconnected by a shape memory material into an endless belt which is reeved about and suspends downwardly from a pulley. Heat is transferred to the material on one side of the belt and extracted from the material on the opposite side so that the field effect elements are drawn together and concentrated on the first side. The imbalance in the force acting on the elements on the two sides of the belt causes rotation of the pulley. While an engine of this design has certain advantages, it also possesses certain limitations and disadvantages. Among these limitations are the friction from the belt and pulley, the requirement for constraining the downwardly hanging free loop of the belt and the resulting friction between that constraint and the belt, and the non-rigidity of the structure such that its end-use applications would be limited.

Accordingly, it is an object of the present invention to provide a field effect memory alloy heat engine incorporating a more simplified design with only one moving part, which operates with relatively low friction and high efficiency, which is of relatively low cost construction, and which is a relatively rigid structure permitting a wide scope of end-use applications.

The invention in summary comprises a wheel having spokes which are mounted about a hub to resiliently displace in the plane of rotation. Field effect elements such as weights are carried on the distal ends of the spokes to coact with a remote force field, such as gravity. A shape memory alloy material is formed about the circumference of the wheel into segments which interconnect the distal ends of adjacent spoke pairs. The segments on one side of the wheel are heated to deform to their memory shape causing the associated spokes to displace toward each other and thereby concentrate the field effect elements on the heated side. The segments on the opposite side of the wheel are cooled permitting them to deform to their trained shape and move apart to reduce the concentration of elements on the cooled side. The difference in concentration of elements between the two sides creates a resultant force from the field which is applied as a torque to rotate the wheel.

The foregoing and additional objects and features of the invention will appear from the following description in which the preferred embodiments have been set forth in detail in conjunction with the drawings.

Figure 1:
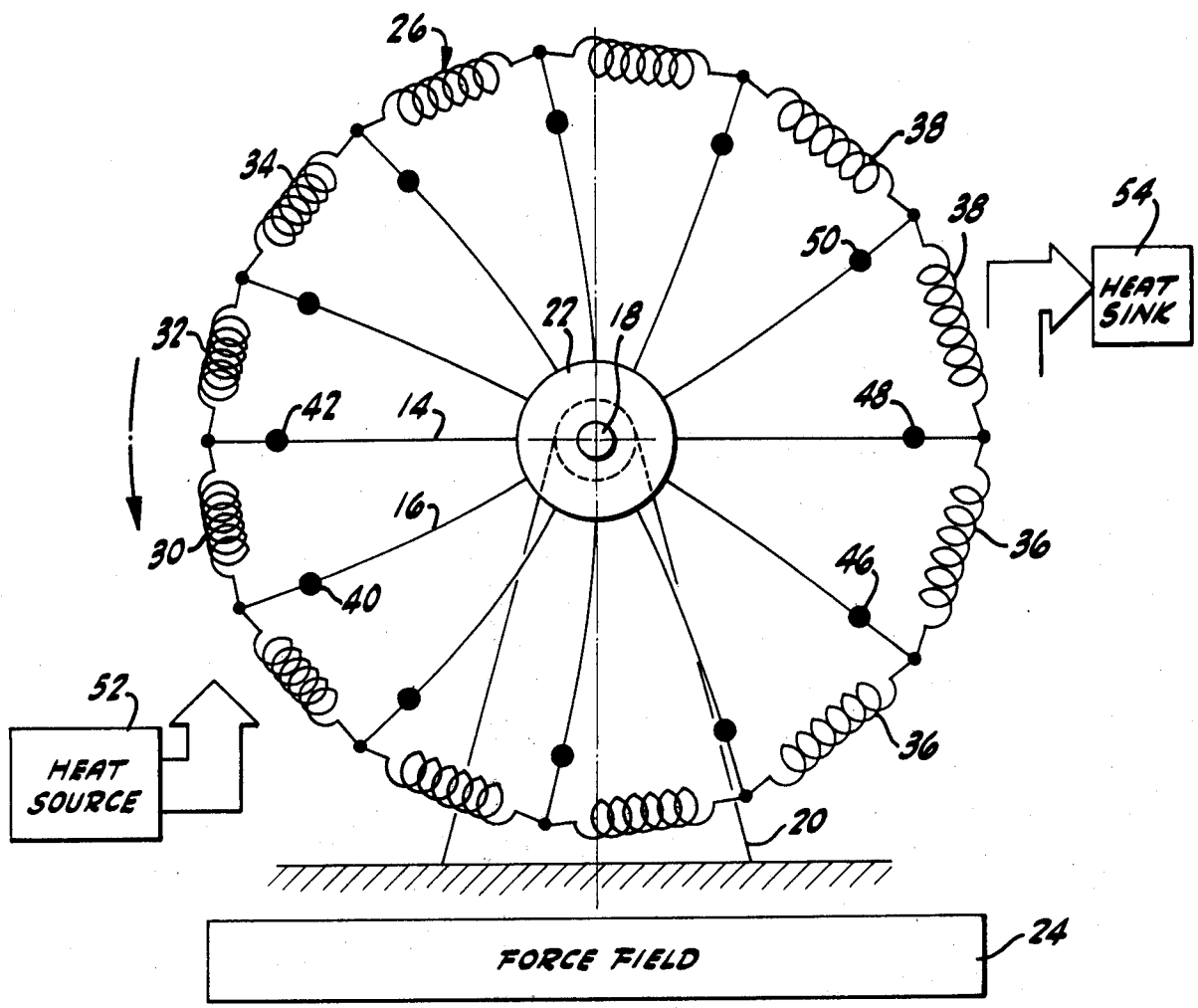
FIG. 1 is a front elevation view in schematic form of a memory alloy heat engine according to the invention.

In the drawings FIG. 1 illustrates generally at 10 the heat engine according to one embodiment of the invention. Engine 10 includes a wheel 12 defined by a plurality of radially extending spokes 14, 16 which are mounted at their proximal ends about the circumference of a hub 18. The hub is mounted above a support 20 on a bearing 22 for rotating the spokes about an axis which is remote from a force field 24. The force field can be gravitational, magnetic or electrostatic. Where the earth's gravity is the force field then the wheel is mounted for rotation in an upright plane and about a substantially horizontal axis.

It is an important feature of the invention that the spokes resiliently displace in the plane of rotation of the wheel. In the illustrated embodiment this displacement is accomplished by forming the spokes of an elastic or flexible material, such as spring steel, so that the ends of the spokes can deflect or bend toward and away from each other. The invention contemplates that other means could be provided for resiliently displacing the spokes, such as providing an elastic, spring or other resilient mounting between the proximal ends of rigid spokes and the hub.

The distal ends of the spokes are interconnected about the circumference of the wheel by a length of alloy 26 having a shape memory effect, herein referred to as "memory alloy". A memory alloy material suitable for use in the invention is Nitinol, a titanium nickel alloy having a 53.5–56.5% nickel content by weight. Other materials having the shape memory effect, such as CuAlNi alloy, or other Joule effect material, could also be used in the invention.

Figure 2:
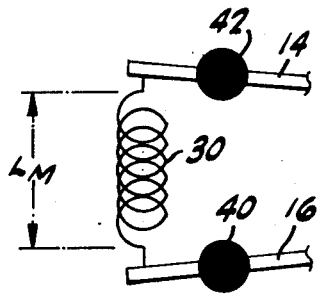
FIG. 2 is a fragmentary front view of a wheel spoke pair and associated memory alloy segment shown in its memory shape.
Figure 3:
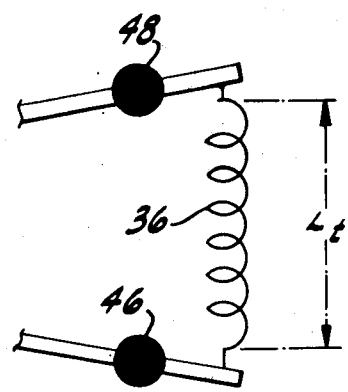
FIG. 3 is a fragmentary front view of a wheel spoke pair and associated memory alloy segment shown in its trained shape.

The memory alloy is formed of a plurality of segments 28–38 each of which is connected at opposite ends between the ends of an associated pair of spokes. Preferably the memory alloy is in a helix configuration, although other configurations could be employed such as zig-zag or a straight wire in tension. All of the segments 28–34 preferably have the same number of helical turns. In accordance with conventional procedures the memory alloy is formed into the helix or other configuration with each segment having the length $L_m$ as depicted in FIG. 2, and the material is then annealed at high temperature so that the shape and length as shown in FIG. 2 becomes the "memory shape". During operation, when the memory alloy is cooled below the phase change transition temperature of the particular alloy material it can be deformed by stretching to the shape and length $L_t$ depicted in FIG. 3, herein called the "trained shape". During a subsequent phase of the operating cycle when the alloy is heated to its transition temperature it will return to its memory shape and contract toward the length $L_m$. The tension force exerted by the alloy as it contracts toward its memory shape is significantly greater than the force required to stretch the alloy to its trained shape of FIG. 3 during the cold phase of the cycle.

A plurality of field effect elements 40-50 are carried distally on the spokes, and in the illustrated embodiment the elements comprise metal bodies mounted on the distal ends of the spokes with the bodies having a mass attracted by gravity to the force field of the earth. The field effect elements could also be permanent magnets or electromagnets where the force field is magnetic, or electrically charged bodies in an electrostatic field.

A heat source 52 is provided for heating the memory alloy segments to their transition temperature on a first or "heated" side of the wheel, and a heat sink 54 is provided for cooling the segments below the transition temperature on the second or "cooled" side. The transition temperature varies according to the characteristics of the particular memory alloy which is employed, and for Nitinol this temperature varies from $-50°$ C. to $+166°$ C. as the nickel concentration is changed from 47 to 53 atomic percent. Any suitable heat source can be employed, such as steam, hot water, hot air or concentrated solar energy. Transfer of heat from the alloy to the sink on the cooled side can be by cold water or air, or by thermal radiation. By interchanging the heat source and heat sink the direction of rotation of the wheel is reversed.

An example of the use and operation of the invention is as follows. An engine 10 is constructed using Nitinol helices as the memory alloy segments 28-34, lead weights as the field effect elements 40-50, and the earth's gravity as the force field 24. Heat in the form of steam is transferred from source 52 to heat the memory alloy segments on the first side to their transition temperature. The segments contract toward their memory shape and pull the distal ends of the spokes together, with the spokes flexing in the plane of wheel rotation. This pulling or tension force is communicated in both directions along the circumference of the wheel so that the spokes flex in series toward the first side. On the cooled or second side of the wheel heat is transferred by radiation and convection to ambient air from the memory alloy segments 36-38 so that they can be deformed by stretching toward their trained shape and length $L_t$ depicted in FIG. 3. A part of the force for stretching the segments to their trained shape is applied by the flexible spokes from the elastic energy stored in the spokes when they were flexed toward each other on the heated side of the wheel. The field effect elements 40-50 or weights carried by the spokes on the cooled side are thereby moved apart a greater distance. The net result is that the concentration of field effect elements or weights on the first side is greater than that on the second side. The resultant force applied to the elements by gravity produces a torque on the wheel which is counterclockwise as viewed in FIG. 1. This torque causes continuous rotation of the wheel for moving the weights and memory alloy segments through their hot and cold phases of operation.

The speed of rotation of the wheel is governed by the rate at which the memory alloy material is heated and cooled. Overheating of the memory alloy must be avoided, otherwise the material will anneal and lose its shape memory effect. The torque applied to the wheel is a function of the strength of the memory alloy segments and the magnitude of the field effect elements or weights.

While the foregoing embodiment is at present considered to be preferred it is understood that numerous variations and modifications may be made therein by those skilled in the art and it is intended to cover in the appended claims all such variations and modifications as fall within the true spirit and scope of the invention.

What is claimed is:

1. A memory alloy heat engine for converting a source of heat into mechanical work, comprising the combination of a wheel mounted for rotation about an axis, the wheel including a plurality of spokes mounted to extend radially from the axis to resiliently displace in the plane of rotation of the wheel, field effect elements carried on the distal ends of the spokes with the elements coacting with a force field located remote from the wheel axis to create a force on each of the elements, shape memory alloy means connected to the distal ends of the spokes, said alloy means deforming between a memory shape and a trained shape when heated to or cooled from, respectively, the phase change transition temperature of the alloy means, said alloy means when heated above said transition temperature causing the spokes associated therewith to displace in one directional sense about the axis and when cooled below said transition temperature causing the spokes associated therewith to displace in an opposite rotational sense about the axis, said displacement of the spokes causing an increase of concentration of the field effect elements on one side of the wheel and a decrease of concentration of the field effect elements on an opposite side of the wheel to create asymmetry in the field force acting on the elements to produce a resultant force which is applied as a net torque on the wheel about the axis.

2. A memory alloy heat engine as in claim 1 which the wheel includes a hub mounted for rotation about the axis, and the proximal ends of the spokes are mounted in circumferentially spaced-apart relationship about the hub.

3. A memory alloy heat engine as in claim 1 in which the spokes are flexible for creating said resilient displacement.

4. A memory alloy heat engine as in claim 1 in which the shape memory alloy means is comprised of a plurality of segments about the circumference of the wheel with each segment connected at its opposite ends with the distal ends of an adjacent pair of spokes.

5. A memory alloy heat engine as in claim 4 in which the memory shape of each segment is shorter than the trained shape whereby the segments contract when heated for concentrating the elements.

6. A memory alloy heat engine as in claim 4 in which one or more of the segments are formed in the shape of a helix.

7. A memory alloy heat engine as in claim 4 in which the memory shape of each segment is longer than the trained shape whereby the segments expand when heated for causing a decrease in concentration of the elements.

8. A memory alloy heat engine as in claim 5 in which the spokes are independently flexible whereby the contraction of any segment applies a tension force along the adjacent segments for flexing the spokes associated therewith toward the first side and increase the concentration of elements on that side.

9. A memory alloy heat engine as in claim 1 in which the force field comprises gravity, and the field effect elements comprise bodies each having a mass which is attracted toward the gravity field.

10. A memory alloy heat engine for converting heat energy into kinetic energy, comprising the combination of a wheel mounted for rotation about a horizontal axis and in a plane which is upright with respect to a gravity field, the wheel including a plurality of resiliently flexible spokes which are disposed about the axis in radially extending, circumferentially spaced-apart relationship, a plurality of weights carried on the distal extremities of the spokes, a shape memory alloy material comprising a plurality of segments disposed about the circumference of the wheel, with the distal ends of each adjacent pair of spokes being interconnected by at least one of the segments, each segment deforming between a memory length and a trained length when heated to or cooled from, respectively, the phase change transition temperature of the alloy material, said memory length being shorter than the trained length, means for heating the segments on a first side of the wheel to raise the temperature thereof to the transition temperature whereby such elements deform toward their memory length and flex the spokes connected therewith toward each other, and means for cooling the segments on the second side of the wheel for permitting the segments to deform to their trained shape and permit the spokes connected therewith to flex away from each other whereby the mass of the weights carried by the spokes on the first side is at a greater concentration than the mass of the weights carried by the spokes on the second side to produce a resultant gravity force on the weights acting as a torque which rotates the wheel about the axis to produce kinetic energy.

11. A memory alloy heat engine as in claim 10 in which the alloy material comprises Nitinol.

12. A memory alloy heat engine as in claim 10 in which the segments are formed in the shape of a helix.

* * * * *